Oct. 20, 1953  F. L. EVERETT  2,656,401
BREAKER MECHANISM FOR DEFERRED ACTION BATTERIES
Filed June 28, 1945

INVENTOR
FRANKLIN L. EVERETT
BY Ralph L. Chappell
ATTORNEY

Patented Oct. 20, 1953

2,656,401

UNITED STATES PATENT OFFICE 2,656,401

BREAKER MECHANISM FOR DEFERRED ACTION BATTERIES

Franklin L. Everett, Silver Spring, Md., assignor to the United States of America as represented by the Secretary of the Navy Application June 28, 1945, Serial No. 601,956

5 Claims. (Cl. 136—90)

This invention relates to batteries of the deferred action type and has particular relation to an improved breaker mechanism for use therein.

A common form of delayed action type galvanic cell is that known as the "reserve cell," wherein the galvanic elements are kept out of contact with the electrolyte by having the electrolyte sealed in an ampoule until the cell is to be put into service. The breaker mechanism of the present invention has found particular use in deferred action batteries of the type disclosed in copending patent application Ser. No. 541,955, filed June 24, 1944. Batteries of this type are well adapted for use with electrically operated projectile fuzes where it is necessary that the electrical circuit remain unenergized until the projectile has been fired in order to prevent accidental firing of the fuze. In cells of this type, the frangible ampoule containing the electrolyte is ordinarily broken by means of a breaker mechanism to release the electrolyte after the projectile has been fired, permitting the electrolyte to contact the anode and cathode elements, thus activating the battery. One difficulty with batteries of this type is that the breaker mechanisms heretofore known have not been entirely dependable in that they have been actuated by accidental impact occasioned by ordinary handling of the projectile containing the battery, or they have failed to be actuated when the projectile has been fired from a gun.

In accordance with the present invention, there is provided a dependable breaker mechanism of novel construction for use in deferred action batteries employing a frangible ampoule containing electrolyte. The new breaker mechanism generally comprises a combined supporting and releasing member normally separating the ampoule and the breaker means and designed to release the ampoule for contact with the breaker means upon the application of a predetermined force of setback which causes movement of the ampoule in the direction of the breaker means against the yielding resistance of the supporting and releasing member.

An object of the present invention is to provide a breaker mechanism for deferred action type batteries which will retain and support a frangible ampoule against the effect of accidental impacts and yet will release the ampoule and permit it to break when it is subjected to the force of setback which is present when a projectile is fired from a gun.

Another object of the invention is to provide a breaker mechanism for delayed action type batteries which will permit release of the frangible ampoule at a predetermined time after the ampoule has been subjected to a force of setback caused by firing a projectile from a gun.

Another object of the invention is to provide a breaker mechanism which may be actuated by centrifugal force and the force of setback to release an ampoule from its safe position.

A further object of the invention is to provide a breaker mechanism for delayed action type batteries which may be easily and economically constructed and yet be rugged during use and positive in operation.

These and other objects of the invention will be understood by reference to the following description and accompanying drawing, in which Fig. 1 is a longitudinal sectional view of a portion of a delayed action type battery embodying a preferred form of the breaker mechanism of the present invention, as it appears in the unactivated or safe condition;

Figure 1:
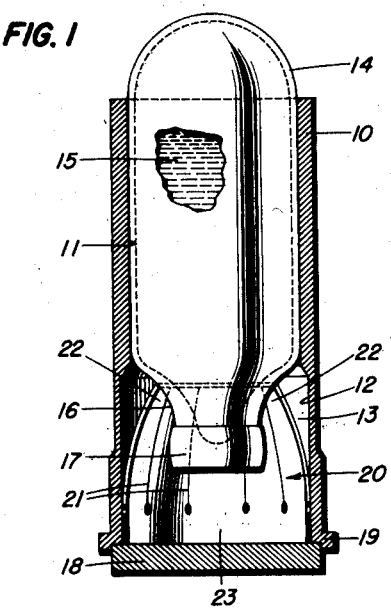
Figure 2:
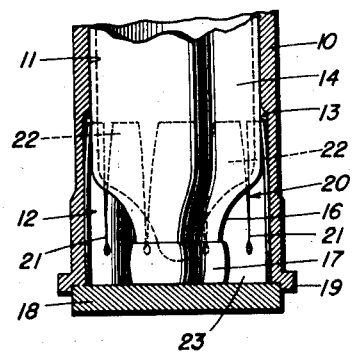
Fig. 2 is a fragmentary view of the structure shown in Fig. 1, illustrating the ampoule supporting and releasing member in its expanded position after releasing the ampoule from its supported position and immediately prior to breaking of the ampoule.

Referring to Figs. 1 and 2 of the drawing, the numeral 10 designates a tubular guide member which may form an element of the battery, such as the type of battery shown in copending patent application Ser. No. 541,955, filed June 24, 1944, wherein the tubular guide member is made of steel and provided with an outer coating layer of carbon (not shown) so as to furnish a cathodic electrode to cooperate with the anode (not shown). The guide member 10 forms an ampoule chamber 11, the base portion of which is provided with a counter bore 12 which forms a breaker chamber 13. A sealed, frangible ampoule 14, made of glass, plastic, or the like, is filled with a suitable electrolyte 15 and provided with a tapered neck portion 16 and a head 17, the ampoule being axially positioned in the ampoule chamber 11 with its neck portion and head projecting into the breaker chamber 13. The guide member 10 is mounted on a breaker plate 18, as by means of a circular flange 19 having an inner counter bore adapted to receive the breaker plate.

A supporting and releasing member 20 is positioned in the breaker chamber 13 for supporting the ampoule 14 and preventing its contact with the base plate 18 until the ampoule is subjected to a predetermined force of setback. The ampoule is seated in inverted position in the open upper end portion of the supporting and releasing member 20 with the tapered neck 16 of the ampoule projecting through the open end defined by the ends of spring fingers 22. The supporting and releasing member 20 comprises an annular, tapered split-sleeve having transversely spaced slits 21 extending from the base portion 23 and defining the tapered spring fingers 22. The supporting and releasing member is preferably fashioned from a blank of spring steel 20A or other resilient material which is readily stamped or pressed to shape and cut with the spaced, preferably V-shaped, slits 21A defining the plurality of tapered spring fingers 22A. The V-shaped cutouts 21A permit the spring fingers 22A to be formed, as by bending, into an annular cluster of inwardly projecting fingers when the blank is fashioned into the form of a frusto-conoid, thus providing a dome-shaped, open-center, supporting arch for the ampoule.

Figure 4:
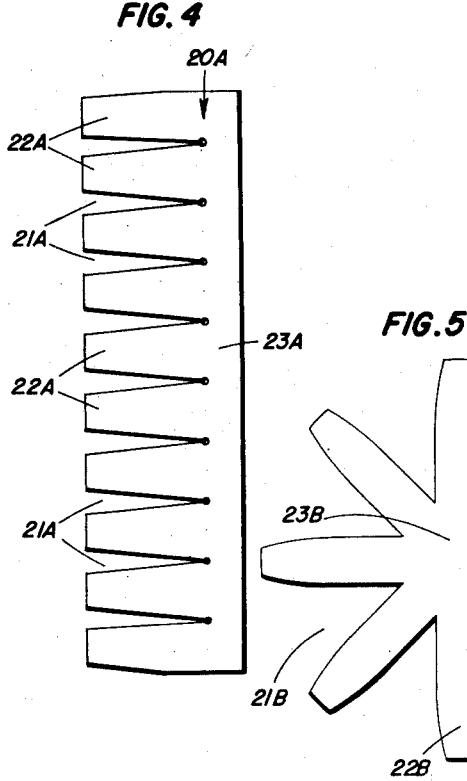
Fig. 4 is an elevational view of the blank from which the breaker member is preferably formed.
Figure 5:
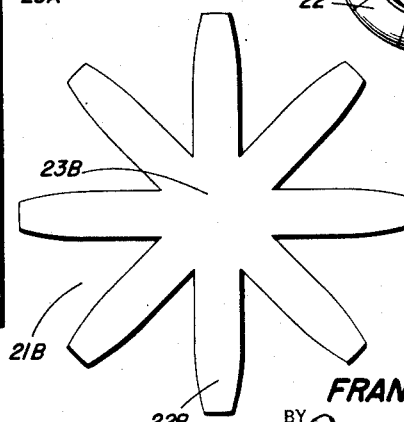
Fig. 5 is an elevational view of another form of blank from which the breaker member is readily formed.
Figure 3:
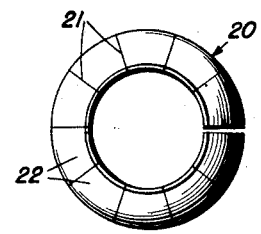
Fig. 3 is a plan view of the supporting and releasing member shown in Figs. 1 and 2.
Figure 6:
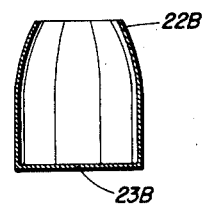
Fig. 6 is a longitudinal sectional view of the breaker member formed of the blank shown in Fig. 5.

Although the preferred manner of construction of the supporting member 20 is accomplished by machining, that is, stamping or pressing and cutting a flat, spring-steel blank to form a comb-shaped member, other methods of forming may be employed. Thus, the member 20 may be made by forming the base portion of a comb-shaped blank around a cylindrical base and bending the spring arms or teeth upwardly as the walls of a cup, or the member may be molded of resilient plastic, or the like. When the spring member is fashioned from a blank, such as is shown in Fig. 4, and bent in frusto-conoid form as shown in Fig. 1, the base portion may be made to fit snugly against the inner wall of the breaker chamber 13, due to the resistance of the blank to deformation and its tendency to expand from the deformed position. As shown in Fig. 5, the spring member may also be readily formed of a piece of flat metal plate stock. The flat metal plate is provided with cutouts 21B which define the fingers 22B which are similar in shape and identical in purpose with the fingers 22. The cutouts 21B further serve to define a solid bottom wall 23B. The finished breaker is formed into a cup-shape by bending the fingers 22B upwardly above the center or bottom wall 23B defined by the cutouts as shown in Fig. 6.

When a deferred action type battery embodying the present invention is employed in an electrically operated projectile, it will remain in an unactivated condition; that is, so long as it is supported by the spring fingers of the supporting and releasing member 20. When the projectile is fired from a gun, the spring fingers are deflected outwardly by camming action of the tapered neck surface 16 resulting from downward axial movement of the ampoule caused by the force of setback operating on the ampoule. As shown in Fig. 2, the downward movement of the ampoule 14, caused by the force of setback, spreads open the cluster of spring fingers 22 of the supporting member 20, and the ampoule plunges through the cluster of outspread spring fingers and shatters upon impact of the head 17 with the base plate 18, thereby releasing the liquid electrolyte which activates the battery.

When the breaker mechanism of the present invention is employed in an electrically operated projectile fired from a rifled gun barrel, centrifugal force caused by spinning of the projectile may be utilized to spread the spring fingers of the supporting and retaining member 20, thereby releasing the ampoule for contact with the breaker. Thus, the supporting and retaining member may be deflected by centrifugal force, by camming action of the ampoule caused by the force of setback, or by a combination of both.

It will be evident that the breaker mechanism of the present invention provides desirable safety features and is positive in action. The supporting member 20 can be so constructed that it will remain in its contracted position until it has been subjected to a predetermined centrifugal force and the ampoule has been simultaneously subjected to a predetermined force of setback. Inasmuch as combined forces of setback and centrifugal force of the high order occasioned by firing a projectile from a rifled gun barrel are practically impossible to duplicate during ordinary handling of a projectile, the possibility of accidentally activating the delayed action battery is negligible.

Obviously many modifications and variations of the present invention are possible in the light of the above teachings. It is therefore to be understood that within the scope of the appended claims the invention may be practiced otherwise than as specifically described.

What is claimed is:

1. In a deferred action battery, breaker means, a frangible sealed ampoule for containing electrolyte and having a tapered external surface portion, and resilient supporting and releasing means including a plurality of fingers for normally separating said ampoule and said breaker means and normally bearing against the tapered surface portion of said ampoule, whereby said fingers of said supporting and releasing means are arranged to release said ampoule for contact with said breaker means upon the simultaneous application of a force of setback upon said ampoule and the application of centrifugal force upon said fingers of said supporting and releasing means.

2. In a deferred action battery, breaker means, a frangible sealed ampoule for containing electrolyte and having a tapered external surface portion, and resilient supporting and releasing means normally separating said ampoule and said breaker means and normally bearing against the tapered surface portion of said ampoule, said supporting and releasing means comprising a plurality of spring fingers deflectable by camming action of said tapered surface portion, whereby said ampoule is movable against said breaker means.

3. In a deferred action battery having a tubular guide defining a chamber, an ampoule mounted in said chamber and having a tapered portion, and a breaker positioned at one end of said chamber, a yieldable support mounted in said chamber for normally maintaining said ampoule spaced from said breaker, said support comprising an annular sleeve having longitudinal slots which define a cluster of spring fingers, the base portion of the sleeve bearing against said breaker and the ends of said spring fingers bearing against said tapered portion of the ampoule, said spring fingers being radially deflectable by movement of said ampoule tapered portion against said spring fingers whereby said ampoule is movable for contact with said breaker.

4. In a deferred action battery having a tubular guide defining a chamber, an ampoule mounted in said chamber and having a tapered portion, and a breaker positioned at one end of said chamber, a yieldable support mounted in said chamber for normally maintaining said ampoule spaced from said breaker, said support comprising a hollow and expansible frusto-conoid member open at its ends and seated at its base end on said breaker, the reduced end of said member receiving said tapered portion of the ampoule and being expansible under pressure of said tapered portion due to a force of setback, whereby said ampoule is movable against the breaker to fracture said ampoule.

5. In a deferred action battery having a tubular guide defining a chamber, an ampoule mounted in said chamber and having a tapered portion, and a breaker positioned at one end of said chamber, a yieldable support mounted in said chamber for normally maintaining said ampoule spaced from said breaker, said support comprising a hollow and expansible frusto-conoid member having an open tapered end and a base end seated on said breaker, the reduced end of said member receiving said tapered portion of said ampoule and being expansible under pressure of said tapered portion due to a force of setback, whereby said ampoule is movable against said breaker to fracture said ampoule.

FRANKLIN L. EVERETT.

References Cited in the file of this patent

UNITED STATES PATENTS

| Number | Name | Date |
|---|---|---|
| 287,924 | Gruson et al. | Nov. 6, 1883 |
| 823,681 | Gulick | June 19, 1906 |
| 1,311,678 | Cartwright | July 29, 1919 |
| 2,403,567 | Wales, Jr. | July 9, 1946 |

OTHER REFERENCES

Selvidge, Electronics, February 1946, pages 104–109.